United States Patent
Sing

[11] Patent Number: 6,161,328
[45] Date of Patent: Dec. 19, 2000

[54] MULTIFUNCTION MONOFILAMENT FLY SWATTER AND BROOM

[76] Inventor: Gordon K. Y. Sing, 91-534 Aekai Pl., Ewa Beach, Hi. 96706

[21] Appl. No.: 09/206,607

[22] Filed: Dec. 7, 1998

[51] Int. Cl.[7] ...................................................... A01M 3/02
[52] U.S. Cl. ................................ 43/137; 15/160; 15/174; 43/132.1
[58] Field of Search .................................... 43/137, 132.1; 15/207.2, 159.1, 160, 184, 172, 174, 175, 144.4, DIG. 4, 173

[56] References Cited

U.S. PATENT DOCUMENTS

| | | |
|---|---|---|
| 395,022 | 12/1888 | Wells . |
| 932,899 | 8/1909 | Plunkett . |
| 983,053 | 1/1911 | Hobart et al. . |
| 1,393,571 | 10/1921 | Riek . |
| 2,202,292 | 5/1940 | Howard . |
| 2,313,675 | 3/1943 | Schultz . |
| 2,417,760 | 3/1947 | Hall . |
| 2,778,043 | 1/1957 | Arf . |
| 2,934,777 | 5/1960 | Hanset . |
| 4,120,115 | 10/1978 | Mushkin ...................................... 43/137 |
| 4,924,358 | 5/1990 | Von Heck ................................... 362/32 |
| 5,375,288 | 12/1994 | Seagren ...................................... 15/169 |
| 5,661,868 | 9/1997 | Panagakos ................................. 15/184 |
| 5,770,307 | 6/1998 | Rackley et al. . |
| 5,816,883 | 10/1998 | Holland ................................... 446/219 |

*Primary Examiner*—Jack W. Lavinder
*Attorney, Agent, or Firm*—Michael I. Kroll

[57] ABSTRACT

A multifunction flyswatter and broom for swatting and sweeping one of flies and bugs away from an area. The multifunction flyswatter and broom includes a handle including a side wall forming a pool therein and an open top end leading into the pool. A plurality of substantially rigid strands are partially received by the pool and extend through the top side of the handle forming a surface for one of swatting and sweeping flies and bugs. A loop may also be provided extending from a second side of the handle for carrying or hanging the multifunction flyswatter and broom. At least one band may be included to extend around the plurality of rigid strands for retaining the plurality of rigid strands together in a bunch, one of the bands may be positioned outside of said pool and moveable along a length of the plurality of rigid strands. The plurality of rigid strands may each be made of a fiber optic cable with a light positioned within the handle on a side of the pool opposite the fiber optic cables for generating a light to illuminate said plurality of fiber optic cables. The handle may be a telescopic handle movable between an extended position and a retracted position.

1 Claim, 10 Drawing Sheets

MULTIFUNCTION MONOFILAMENT FLY SWATTER AND BROOM

BACKGROUND OF THE INVENTION

1. Field of the Invention

The present invention relates generally to fly swatters and more specifically to a device having a handle with a loop for holding or carrying and a plurality of rigid monofilament strands bound on one distal end by the handle.

2. Description of the Prior Art

Numerous types of fly swatters designed to kill flies have been provided in the prior art. For example, U.S. Pat. Nos. 932,899; 983,053; 2,202,292; 2,417,750; 2,934,777 and 5,770,307 all are illustrative of such prior art. While these units may be suitable for the particular purpose to which they address, they would not be as suitable for the purposes of the present invention as heretofore described.

U.S. Pat. No. 932,899

Inventor: Charles Plunkett

Issued: Aug. 31, 1909

This patent discloses a brush comprising a bunch of fibers secured together and cemented at their upper ends, a ferrule surrounding said upper ends, elliptical in cross section, and having a flattened lower end compressing the fibers below the cemented portion, said ferrule being provided with an interlocking seam at its meeting edges, and with a plurality of indentations along said seam, the layers of the seam being perforated, and the burs extending into the fibers, substantially as specified.

U.S. Pat. No. 983,053

Inventor: M. R. Hobart et al.

Issued: Jul. 31, 1911

This patent discloses a whisk broom with improved clamping means for holding the bristles in a flat broom form. The clamping means comprising a metal band having a channel running longitudinally on one side for receiving a metal reinforcing ring. The metal bands also having corrugations on the upperside for reinforcement and perforated overlapping ends. The metal ring and metal band are positioned over the conically shaped collection of bristles having a handle portion and broom portion and compressed on the broom portion to a flattened form whereupon a tack is placed into the perforation of the overlapping end of the metal band thereupon a metal clamp is crimped over the tack and overlapping end of the metal band.

U.S. Pat. No. 2,202,292

Inventor: Edward T. Howard

Issued: May 28, 1940

This patent discloses a brush wherein a handle, using a moldable material, is formed and molded around and permeating the spaces between the bristles of a tuft of bristles which is placed within one end of the mold and wherein the bristles forming the tuft can be bound on the molded end by wire or band having projections to ensure a tight joint with the molded handle.

U.S. Pat. No. 2,417,750

Inventor: Elisha W. Hall

Issued: Mar. 18, 1947

This invention relates to brushes. In accordance with the invention, individual bristles without loops, wires or other fasteners are adhesively held in a head comprising an adhesive plastic preferably containing small particles of a fibrous substance such as hardwood sawdust, for example. A separate handle may have one end adhesively held in the head or some of the bristles may be prolonged beyond the head and incorporated in a handle.

U.S. Pat. No. 2,934,777

Inventor: Eugene Hanset

Issued: May 3, 1960

This patent discloses a plastic broom or brush and method of fabrication. A broom having a flexible, plastic inverted cup-shaped mold and cover member having an open material receiving and confining mouth; a plurality of broom fibers arranged in a bundle with one end thereof bonded into a relatively rigid head within the mold and cover member, the head being composed of a casting resin or a polyester type resin and the fibers are disposed wholly within the mouth of the cup-shaped mold and cover member, and a transversely bulbous enlarged section at the base of the fibers by which shape the head stretches and supports the mold and cover member transversely distorted in a plane normal to the transverse bulbous enlarged section, whereby the cover portions surrounding the mouth thereof yieldably embrace and confine the bristles adjacent the head.

U.S. Pat. No. 5,770,307

Inventor: Robert Lee Rackley et al.

Issued: Jun. 23, 1998

This invention relates to a coextruded monofilament having a core material made of a first resin and a sheath material made of a second resin, with the second resin being different from the first, and a pocket formed in the end of the monofilament. This invention also relates to a method of forming a pocket in the end of a coextruded monofilament by chemical or mechanical means, or a combination of chemical an mechanical means.

SUMMARY OF THE PRESENT INVENTION

The present invention relates generally to fly swatters and more specifically to a device having a handle with a loop for holding or carrying and a plurality of rigid monofiliment strands bound on one distal end by the handle.

A primary object of the present invention is to provide a multifunction flyswatter and broom that will overcome the shortcomings of prior art devices.

Another object of the present invention is to provide a multifunction flyswatter and broom which is able to be used to swat insects with greater speed and surface area for killing the insects as well as sweeping insects away.

A further object of the present invention is to provide a multifunction flyswatter and broom having a number of monofiliment strands held together at one distal end by a handle.

A yet further object of the present invention is to provide a multifunction flyswatter and broom having means on the handle for carrying or hanging said device.

A further object of the present invention is to provide a multifunction flyswatter and broom including a telescopic handle able to extend and retract over the fibers extending therefrom.

Another object of the present invention is to provide a multifunction flyswatter and broom that is simple and easy to use.

A still further object of the present invention is to provide a multifunction flyswatter and broom that is economical in cost to manufacture.

Additional objects of the present invention will appear as the description proceeds.

A multifunction flyswatter and broom for swatting and sweeping one of flies and bugs away from an area is disclosed by the present invention. The multifunction flyswatter and broom includes a handle including a side wall forming a pool therein and an open top end leading into the pool. A plurality of substantially rigid strands are partially received by the pool and extend through the top side of the handle forming a surface for one of swatting and sweeping flies and bugs. A loop may also be provided extending from a second side of the handle for carrying or hanging the multifunction flyswatter and broom. At least one band may be included to extend around the plurality of rigid strands for retaining the plurality of rigid strands together in a bunch, one of the bands may be positioned outside of said pool and moveable along a length of the plurality of rigid strands. The plurality of rigid strands may each be made of a fiber optic cable with a light positioned within the handle on a side of the pool opposite the fiber optic cables for generating a light to illuminate said plurality of fiber optic cables. The handle may be a telescopic handle movable between an extended position and a retracted position.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the multifunction flyswatter and broom of the present invention. With regard to the reference numerals used, the following numbering is used throughout the various drawing figures.

- 10 multifunction flyswatter and broom of the present invention
- 12 ground on which user is seated
- 14 user
- 16 blanket
- 18 handle of multifunction flyswatter and broom
- 20 rigid strands extending from handle
- 22 loop connected to handle
- 24 wrist of user
- 26 group of bugs
- 28 single bug on blanket
- 30 dashed lines indicating movement of rigid strands
- 32 first end of handle
- 34 second end of handle
- 36 open top side of second end
- 38 band around plurality of rigid strands
- 40 pool
- 42 band extending around the plurality of strands and positioned outside of pool
- 44 lower section of handle
- 46 wall separating lower section of handle and pool
- 48 fiber optic cables forming plurality of strands
- 50 lines indicating illumination of fiber optic cables
- 52 light
- 54 reflective surface surrounding light
- 56 power source
- 58 telescopic handle
- 60 plurality of interengaging sections 60
- 62 open top side of each of the plurality of interengaging sections
- 64 rim extending around each open top side
- 66 protrusion
- 68 base side of each of the plurality of interengaging sections

DETAILED DESCRIPTION OF THE PREFERRED EMBODIMENT

Turning now descriptively to the drawings, in which similar reference characters denote similar elements throughout the several views, FIGS. 1 through 10 illustrate the multifunction flyswatter and broom of the present invention indicated generally by the numeral 10.

Figure 1:
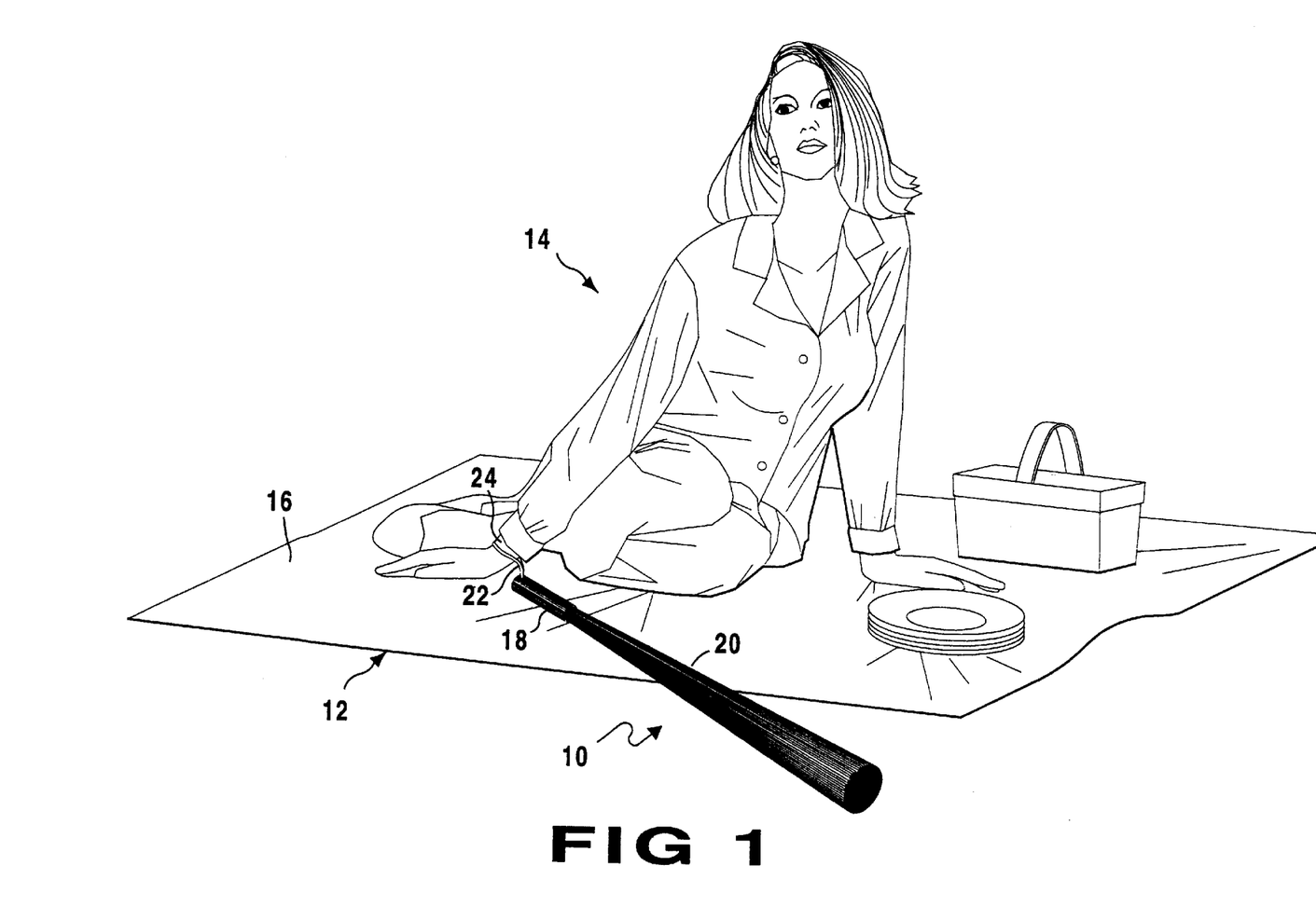
FIG. 1 is a front perspective view of the multifunction flyswatter and broom of the present invention positioned on a floor next to a user.

The multifunction flyswatter and broom 10 is illustrated in FIG. 1 positioned on a ground surface 12 adjacent a potential user 14. The user 14 is seated on a blanket 16 enjoying a picnic. The multifunction flyswatter and broom 10 includes a handle 18 including a plurality of substantially rigid strands 20 extending therefrom. Connected to an end of the handle 18 opposite the end through which the rigid strands 20 extend is a loop 22. The loop 22 is used to aid the user 14 in carrying the multifunction flyswatter and broom 10 and may be secured around a wrist 24 of the user 14.

Figure 2:
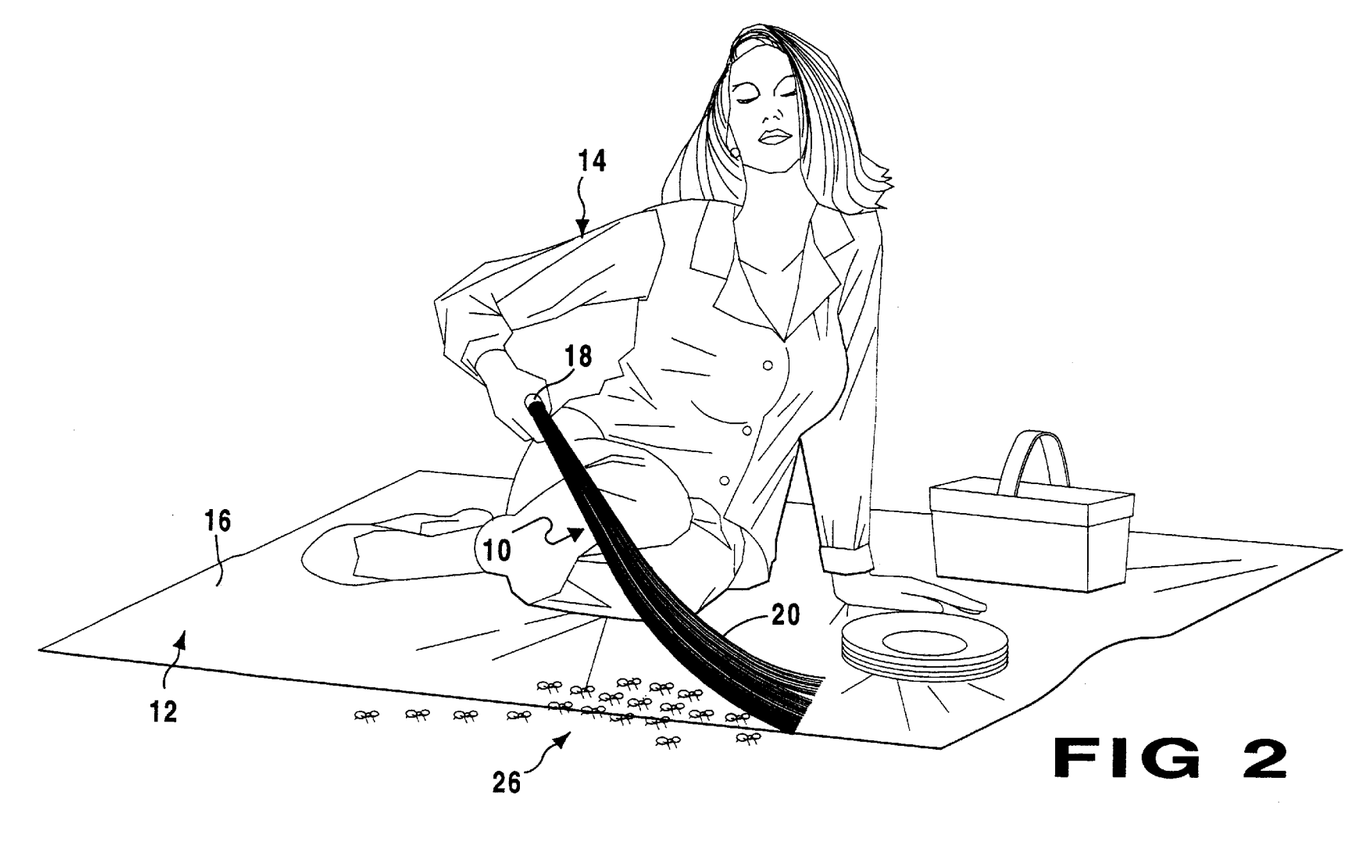
FIG. 2 is a front perspective view of the multifunction flyswatter and broom of the present invention being picked up by a user in preparation for use.

FIG. 2 illustrates the user 14 preparing to use the multifunction flyswatter and broom 10 to sweep away bugs 26 gathering on the blanket 16 and disrupting the picnic. The bugs 26 are attracted by the smell of the food being eaten and gather on the blanket 16 in attempt to get some of the food. The multifunction flyswatter and broom 10 is picked up by the user 14 by grasping the handle 18. The rigid strands 20 are positioned on the blanket 16 and in front of the group of bugs 26. The handle 18 is then pivoted causing the rigid strands 20 to rotate in a sweeping motion thereby sweeping the group of bugs 26 off of the blanket 16 and away from the picnic.

Figure 3:
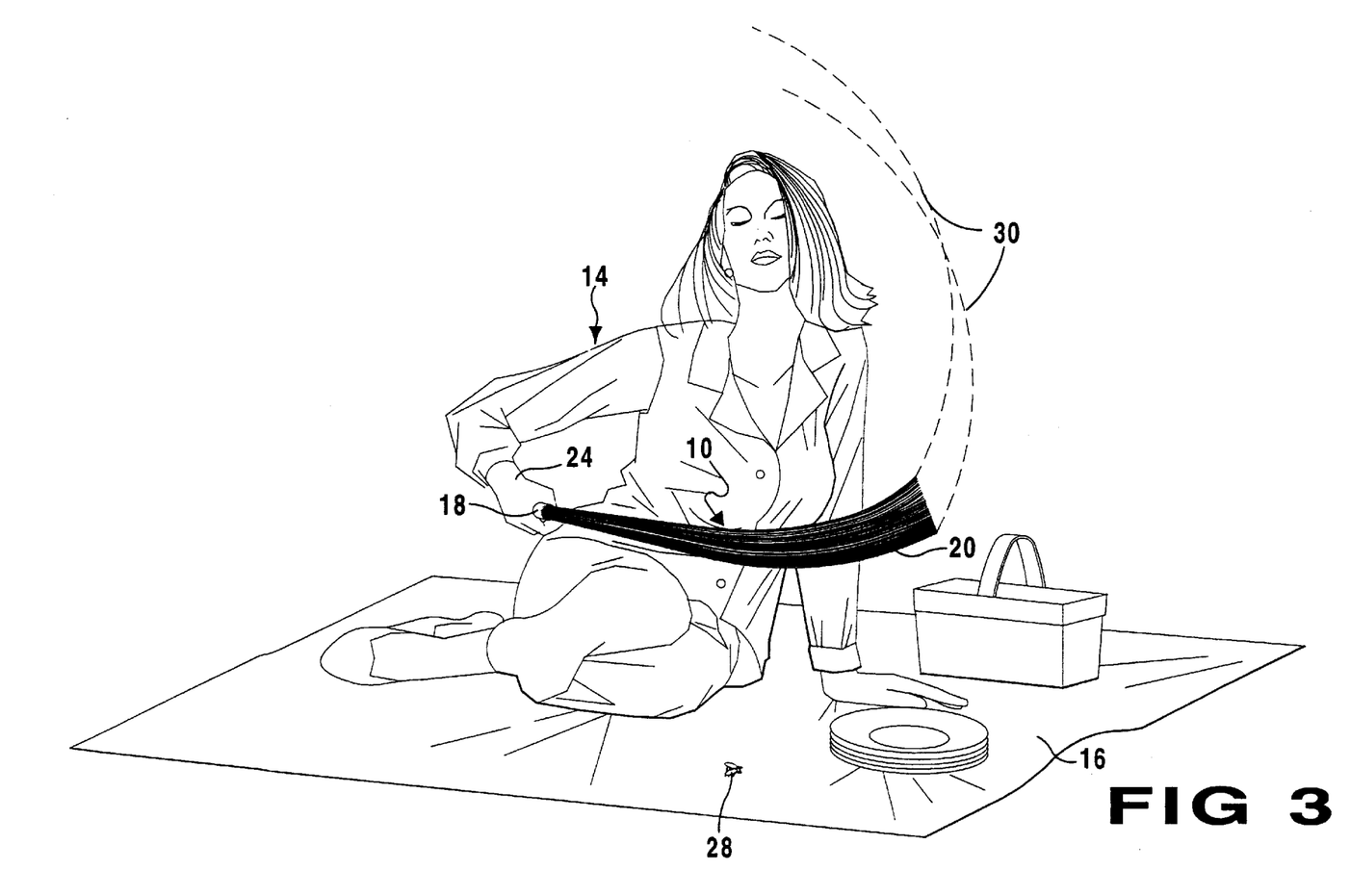
FIG. 3 is a front perspective view of the multifunction flyswatter and broom of the present invention being used by a user to swat flies.

Alternatively, the multifunction flyswatter and broom 10 may be used as illustrated in FIG. 3 to get rid of a single bug 28. In this instance, the user 14 will pick up the handle 18 raising the rigid strands 20 off of the ground 12. When the user 14 flicks the wrist 24 the rigid strands 20 are caused to rotate in a direction indicated by the dashed lines labeled 30 and towards the bug 28 positioned on the blanket. This movement of the rigid strands 20 will cause the bug 28 to be crushed between the rigid strands 20 and the ground 12 thereby killing the bug 28 and removing the annoyance.

Figure 4:
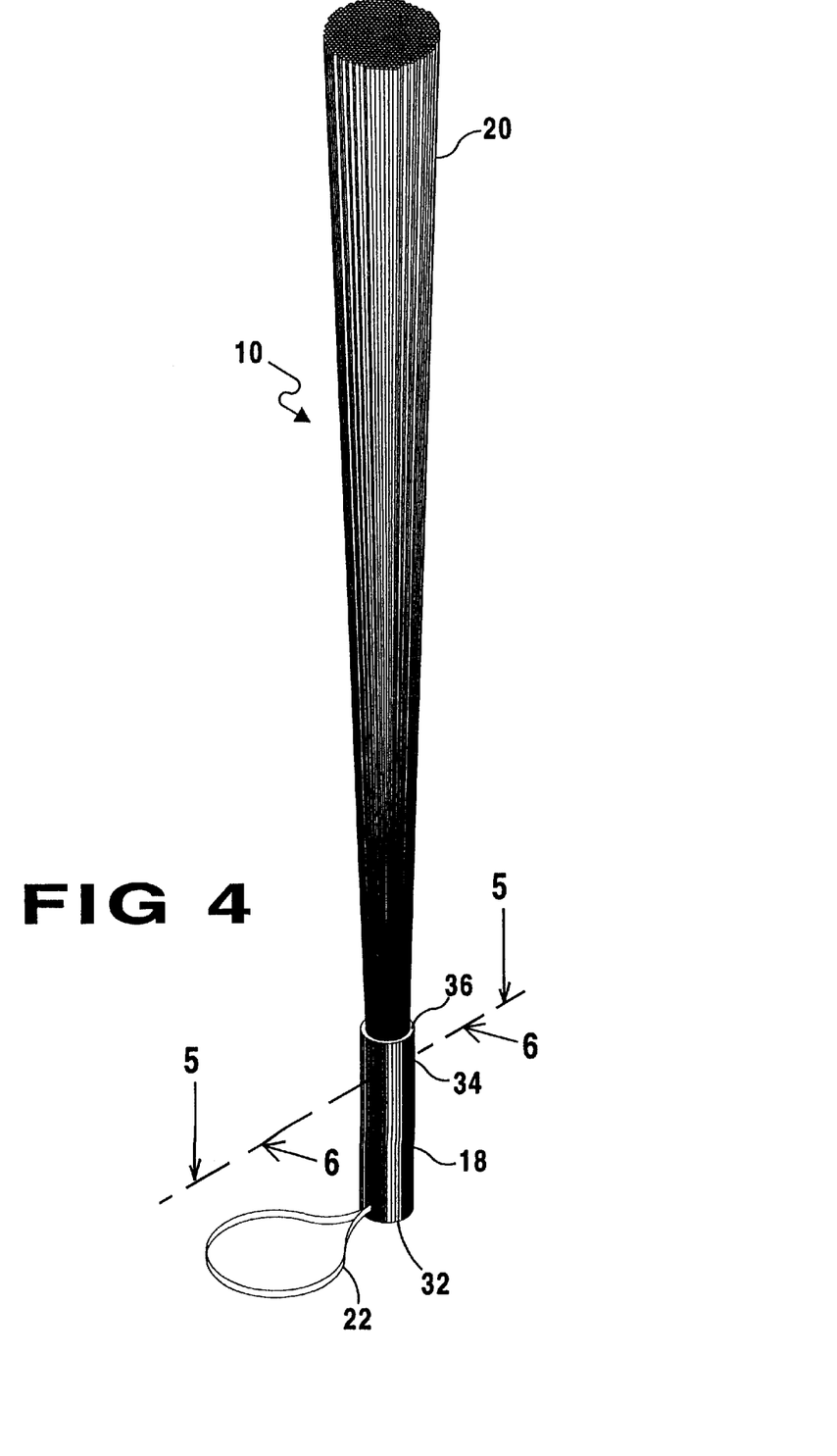
FIG. 4 is a front perspective view of the multifunction flyswatter and broom of the present invention.

A side view of the multifunction flyswatter and broom 10 is illustrated in FIG. 4. This view clearly illustrates the components of the multifunction flyswatter and broom 10. The multifunction flyswatter and broom 10 includes a handle 18 including a first flat end 32 on which the multifunction flyswatter and broom 10 may be balanced and a second end 34 having an open top side 36. The top side 36 provides an entrance to a pool formed within and extending through a portion of the handle 18. The plurality of substantially rigid strands 20 are partially received by and held within the pool formed in the handle 18. The rigid strands 20 extend from the handle 18 so as to form the swatting or sweeping section of the multifunction flyswatter and broom 10. Extending from the first end 32 of the handle 18 is a loop 22. The loop 22 may be positioned about the wrist of the user for aiding the user in carrying the multifunction flyswatter and broom 10.

The rigid strands are preferably made of a substantially rigid plastic having a degree of flexibility and extend a distance of preferably substantially 26 inches from the top side 36 of the handle. Alternatively, the rigid strands 20 may be made of any polymeric material or any substantially rigid material which would provide the desired results. Preferably there are approximately 175 strands received within the pool of the handle 18. The rigidity of the strands 20 must minimize the amount of wind created when the multifunction flyswatter and broom 10 is rotated to sweep or swat a bug thereby minimizing the amount of notice provided to the bug and minimizing the time the bug has to escape when the multifunction flyswatter and broom 10 is being used to swat the bug.

The handle 18 is preferably made of a molded plastic material. Alternatively, the handle 18 may be made of any polymeric material or any substantially rigid material able to receive and retain the rigid strands therein.

Figure 5:
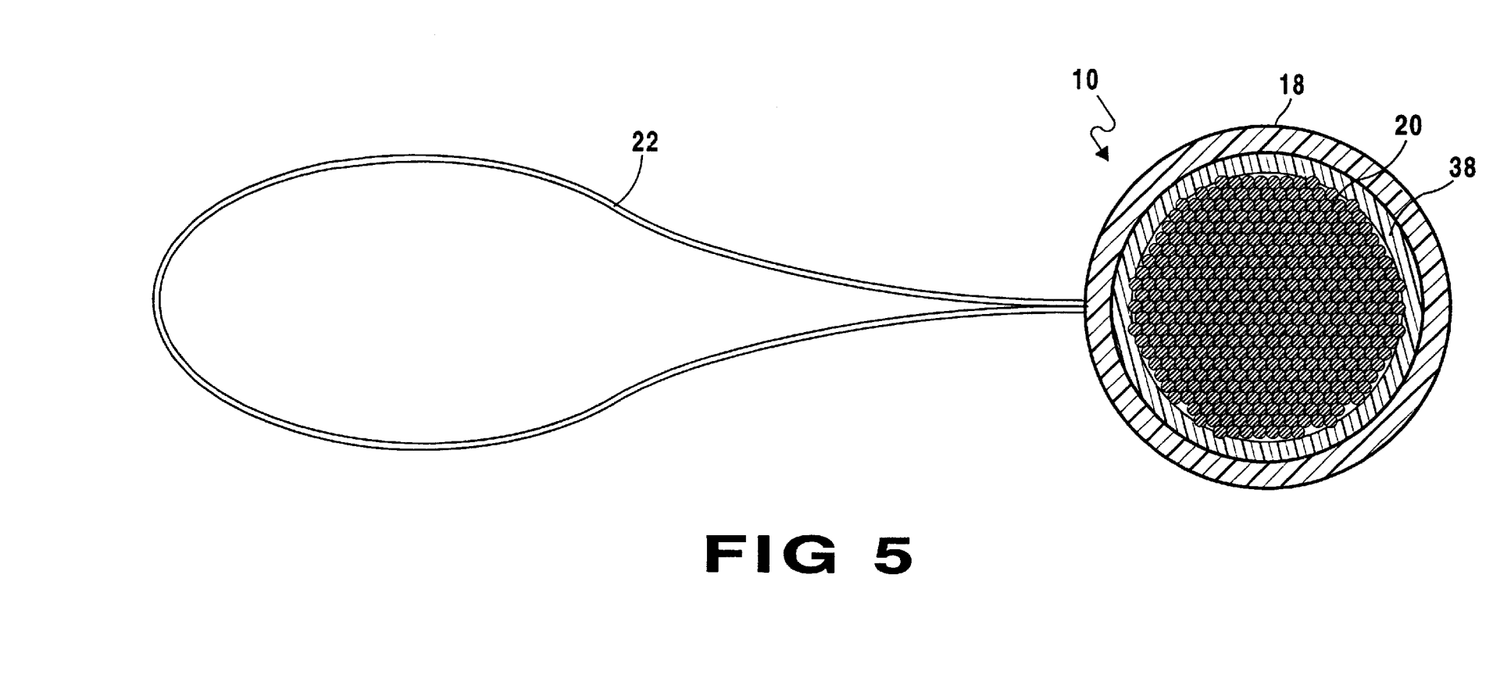
FIG. 5 is a top perspective view of the multifunction flyswatter and broom of the present invention.

A top cross sectional view of the multifunction flyswatter and broom 10 is illustrated in FIG. 5. This view is taken along the line 5—5 of FIG. 4. Form this view the plurality of rigid strands 20 are seen wrapped in a bunch by a band 38. The band 38 holds the plurality of rigid strands 20 together and has an outer circumference able to fit within the pool formed in the handle 18. Also shown in this figure is the loop 22 extending from the handle 18.

Figure 6:
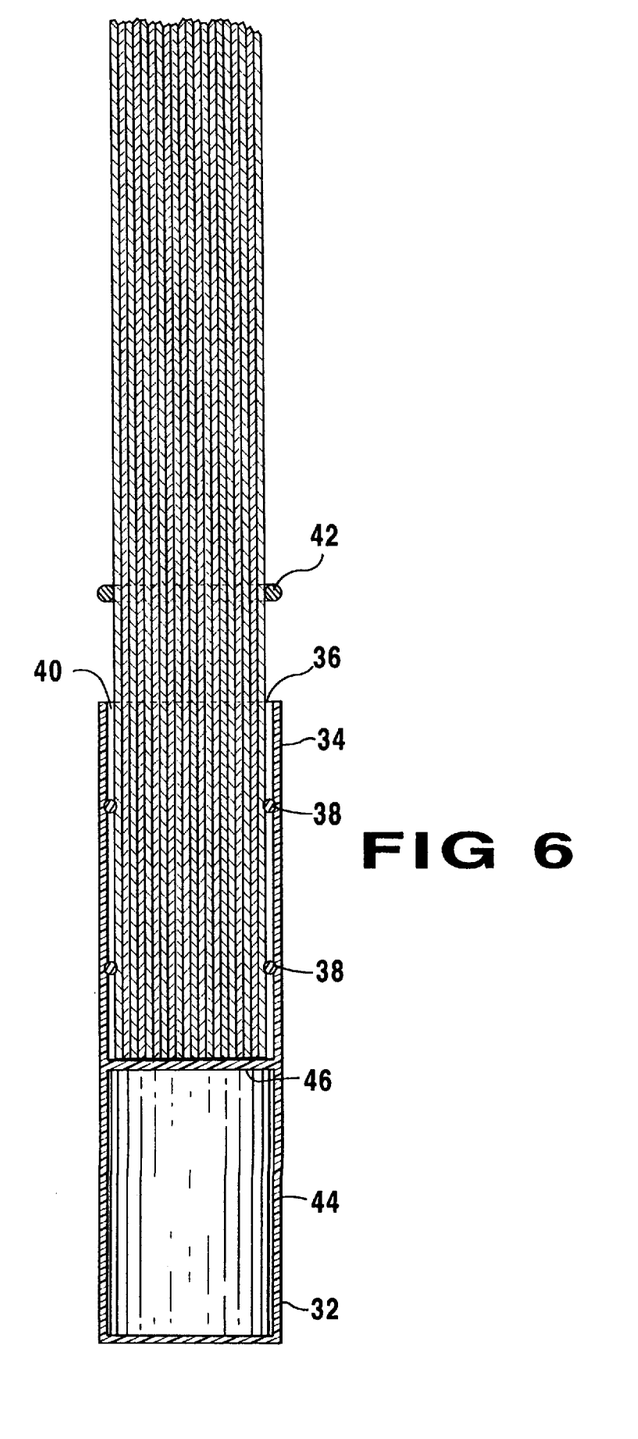
FIG. 6 is a side cross-sectional view of the multifunction flyswatter and broom of the present invention.

A side cross-sectional view of the multifunction flyswatter and broom 10 is illustrated in FIG. 6. This view is taken along the line 6—6 of FIG. 4. The pool 40 is illustrated receiving the plurality of rigid strands 20. The plurality of rigid strands 20 extend partially into the pool 40 and include a plurality of bands 38 positioned therearound to hold the rigid strands 20 closely together as a group. One band 42 is positioned around the rigid strands 20 outside of the pool 40 and is moveable along the length of the rigid strands 20. This band 42 adjusts the tension between the strands 20 and how tightly the strands 20 will be held together along their length. The pool 40 extends only partially through the length of the handle 18. The handle 18 includes a lower section 44 positioned below the pool 40 and separated therefrom by a wall 46. The lower section 44 is preferably hollow.

Figure 7:
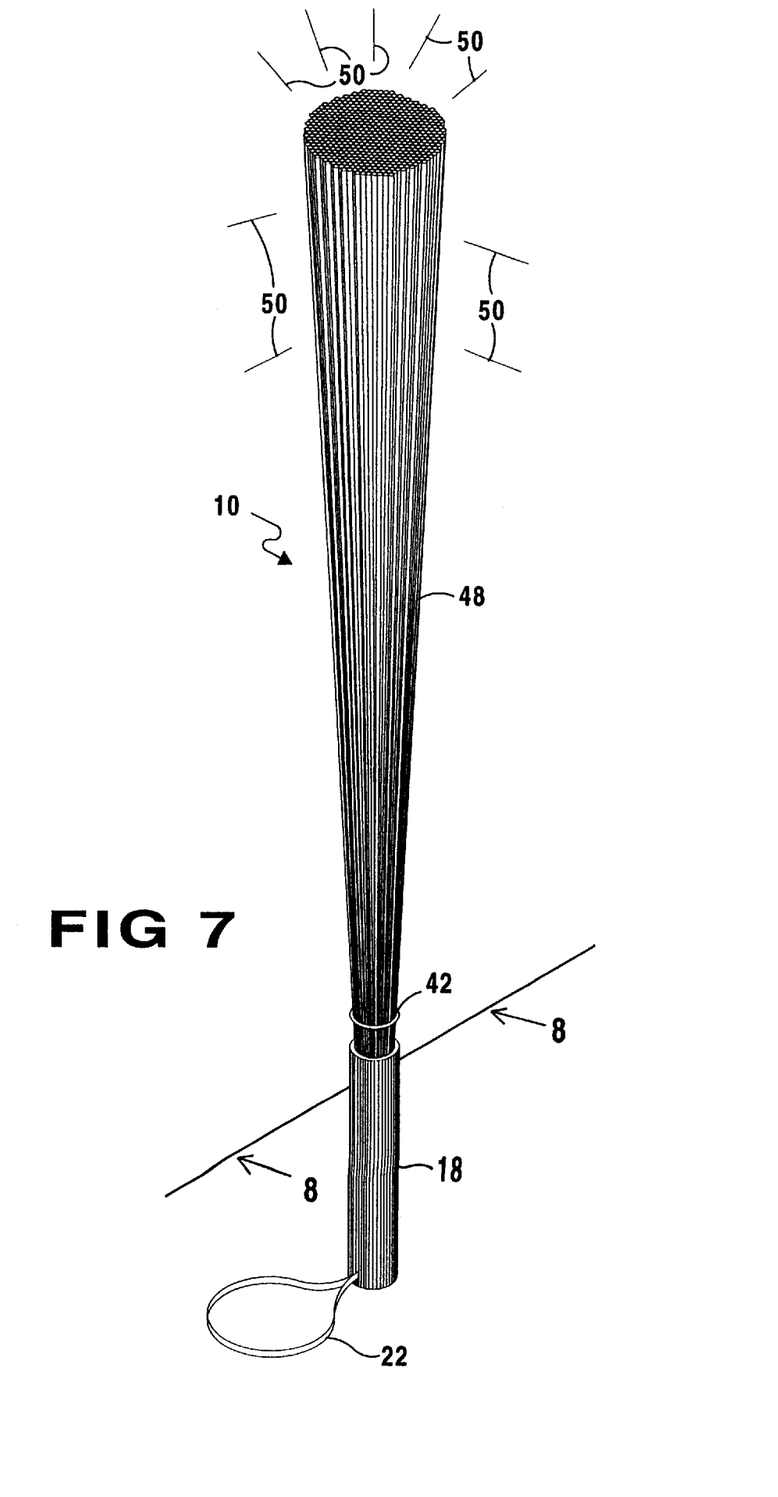
FIG. 7 is a side view of an alternate embodiment of the multifunction flyswatter and broom of the present invention including a fiber optic cable used as the monofilaments.
Figure 8:
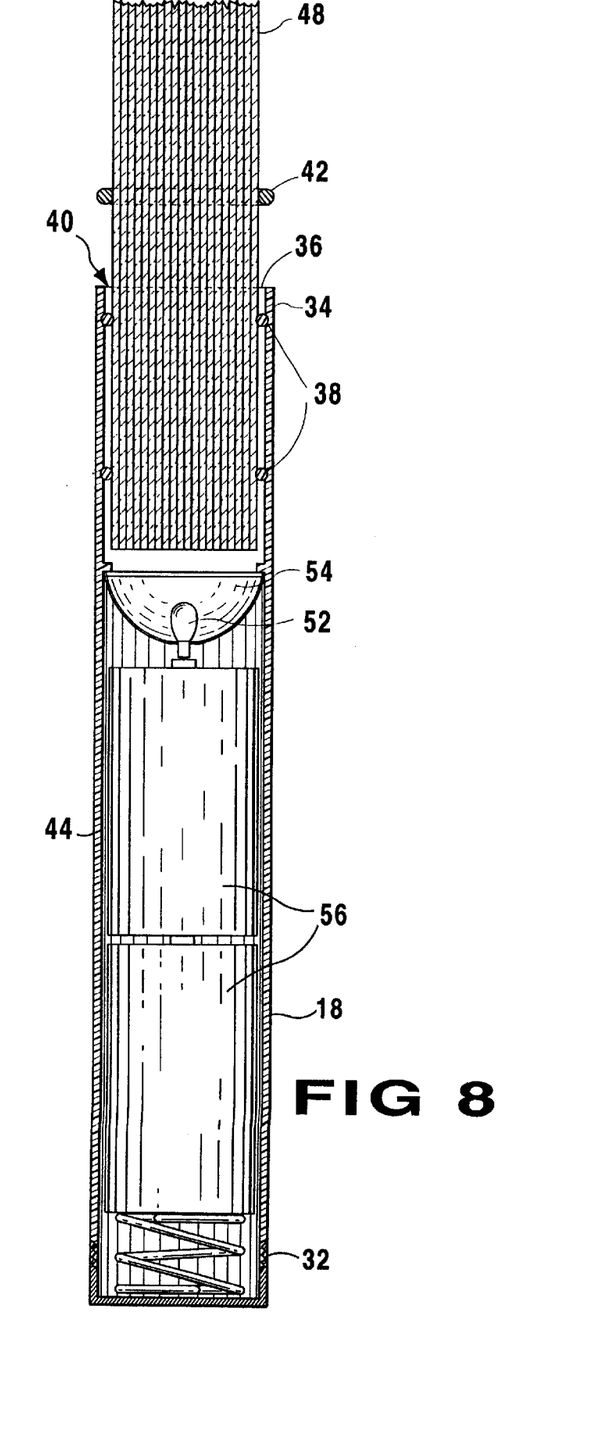
FIG. 8 is a cross-sectional view of the second embodiment of the multifunction flyswatter and broom of the present invention taken along the line 8—8 of FIG. 7.

FIG. 7 illustrates the multifunction flyswatter and broom 10 including a plurality of rigid strands formed of fiber optic cables 48. The ability of the fiber optic cables 48 to illuminate is indicated by the lines identified by the numeral 50. A cross-sectional view of the multifunction flyswatter and broom 10 taken along the line 8—8 of FIG. 7 is illustrated in FIG. 8. From this view, the position of the fiber optic cables 48 within the pool 40 is clearly seen. Positioned in the lower section 44 of the handle 18 is a light 52 which provides light into the pool 40 and causes the fiber optic cables 48 to illuminate. The light 52 is surrounded by a reflective surface 54 to direct the light produced thereby towards the fiber optic cables 48. Positioned within the lower section and below the light 52 is a power source 56 which provides power to the light 52 causing the light 52 to illuminate. The power source 56 is shown as a pair of batteries however any known conventional power source may be used as long as it will fit within the handle 18 and provide enough power to cause the light to illuminate for an extended period of time.

Figure 9:
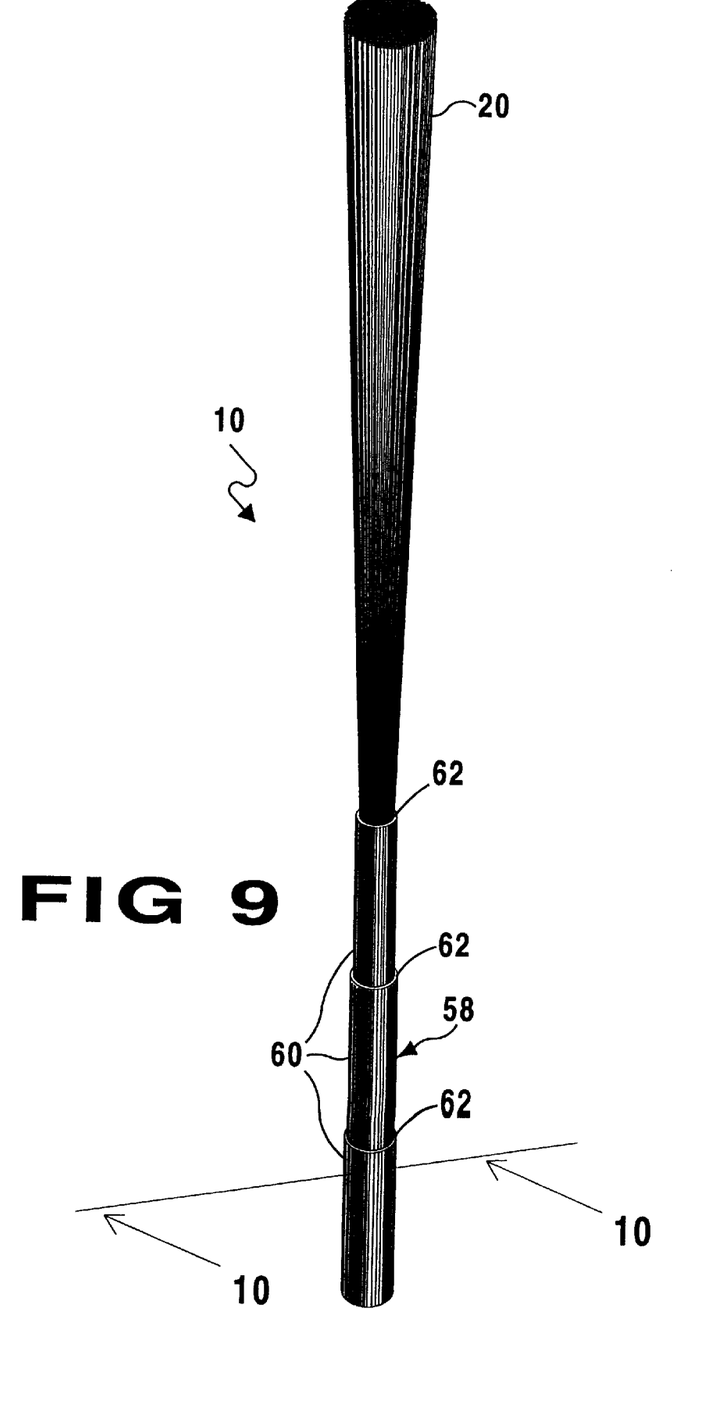
FIG. 9 is a side view of a third view of the multifunction flyswatter and broom of the present invention including a telescopic handle.
Figure 10:
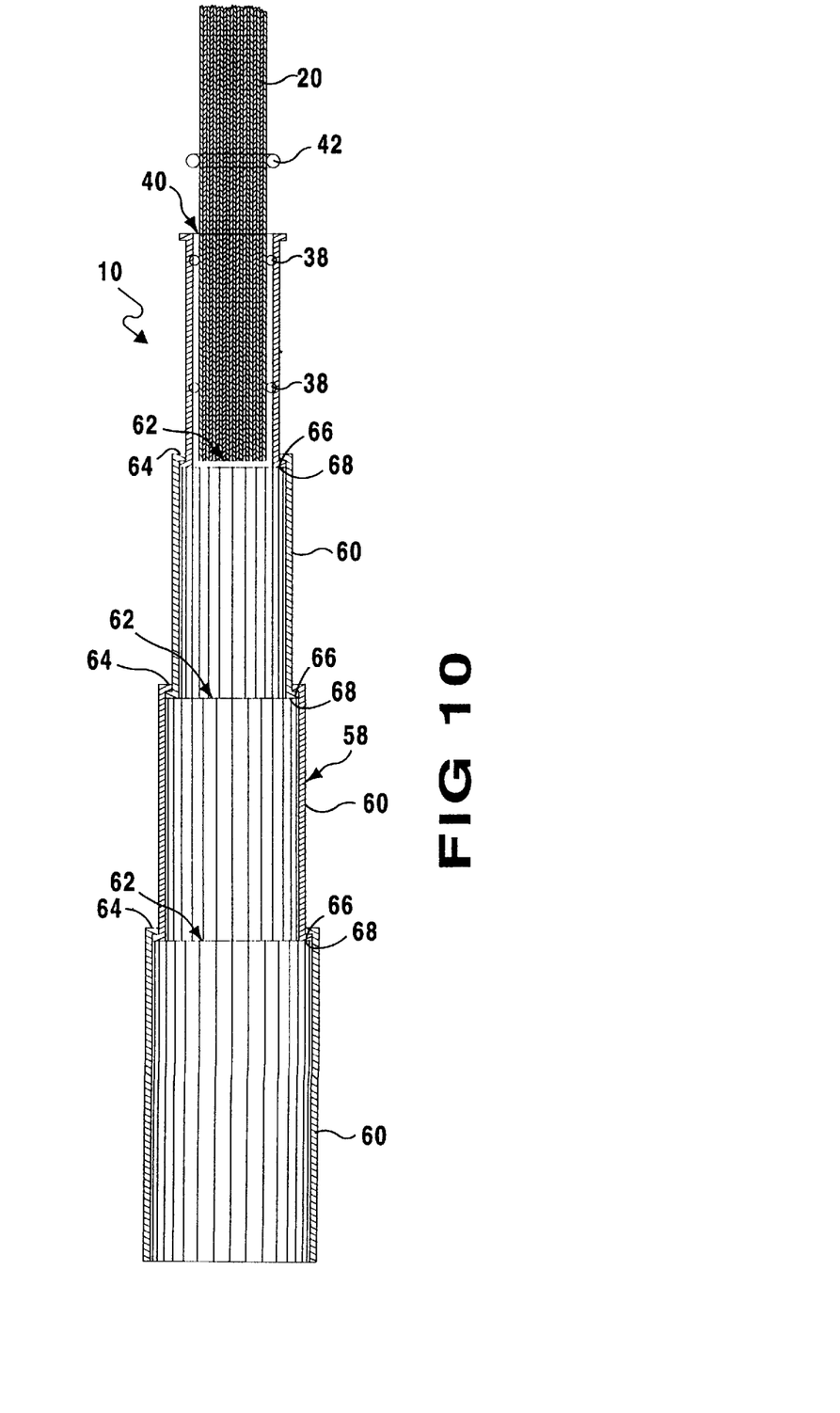
FIG. 10 is a cross-sectional view of the third embodiment of the multifunction flyswatter and broom of the present invention taken along the line 10—10 of FIG. 9.

FIGS. 9 and 10 illustrate the multifunction flyswatter and broom 10 including a telescopic handle 58. FIG. 10 is a cross-sectional view of FIG. 9 taken along the line 10—10. The telescopic handle 58 includes a plurality of interengaging sections 60. The plurality of interengaging sections 60 are positioned one inside the other, each section having a larger circumference than the section positioned therein. Each section is hollow and includes an open top side 62 with a rim 64 extending therearound. A protrusion 66 extends around a base side 68 of each section for engaging the rim 64 of the section in which it is place when the telescopic handle 58 is in an extended position.

The operation of the multifunction flyswatter and broom 10 will now be described with reference to the figures. In operation, when a user spots a fly or bug which is desired to be swatted or swept away, the user will lift the multifunction flyswatter and broom 10 by grasping the handle 18. If it is desired to sweep the fly or bug away, the user will move the rigid strands to a position in the line of motion of the fly or bug and in contact with the ground. By flicking the wrist 24 in the direction of the fly or bug, the user will cause the rigid strands to rotate therewith and sweep the fly or bug away. If it is desired to swat the fly or bug, the user will grasp the handle 18 and lift the rigid strands in the air to a position above the fly or bug. The user will then flick the wrist in a direction towards the fly or bug causing the rigid strands to rotate towards the ground and swat the fly or bug.

If the multifunction flyswatter and broom 10 illustrated in FIGS. 7 and 8 is being used, the user must provide power to the fiber optic cables 48 and then when the multifunction flyswatter and broom 10 is used to swat or sweep a fly or bug away, a streak of light will be produced following the fiber optic cables 48 as they rotate with the handle 18.

If the telescopic handle 58 is used, the user may need to extend the handle to reach a fly or bug in a far away or difficult location. In order to extend the handle and thus increase the reach of the user, the user will simply grasp the outermost section 60 and apply a force in a direction away from the rigid strands 20. This will cause the plurality of sections to slide away from the section positioned therein until the protrusion extending around the base of one section engages the rim around the top side of the section positioned immediately therein. The force is applied until the handle is of the desired length. To retract the handle 18 a force is applied in the opposite direction until each section is positioned completely within the section immediately theresurrounding. In its retracted position the multifunction flyswatter and broom 10 is ready for storage after use.

From the above description it can be seen that the multifunction flyswatter and broom of the present invention is able to overcome the shortcomings of prior art devices by providing a multifunction flyswatter and broom which is able to swat insects with greater speed and surface area for killing the insects as well as sweeping insects away. The multifunction flyswatter and broom includes a number of monofiliment strands held together at one distal end by a handle and a device positioned on the handle for carrying or hanging the device. The multifunction flyswatter and broom are also include at least one of a telescopic handle able to extend and retract over the fibers extending therefrom and fiber optic cables as strands which are able to produce a lighted end and create a streak of light during use. Furthermore, the multifunction flyswatter and broom of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multifunction flyswatter and broom for swatting and sweeping one of flies and bugs away from an area, said multifunction flyswatter and broom comprising:

a) a cylindrical handle including a side wall forming a pool circular in cross section therein and an open top end leading into said pool;

b) a plurality of substantially rigid strands partially received by said pool and extending through said open top end of said handle forming a surface for one of swatting and sweeping flies and bugs, said plurality of rigid strands being each a fiber optic cable;

c) a plurality of fixed spaced bands positioned along the inside of said handle and a band positioned around the rigid strands outside of said pool movable along a length of the rigid strands to hold said rigid strands together as a group;

d) a light positioned within said handle on a side of said pool opposite said plurality of fiber optic cables for generating a light to illuminate said plurality of fiber optic cables; and e) a reflective surface partially surrounding said light for reflecting the light produced thereby towards said plurality of fiber optic cables.

* * * * *